United States Patent [19]

Blumhardt

[11] 4,223,741

[45] Sep. 23, 1980

[54] VEHICLE FOR AGRICULTURAL USE WITH TRANSPORT WHEELS

[75] Inventor: Harold Blumhardt, Ashley, N. Dak.

[73] Assignee: Blumhardt Mfg., Inc., Ashley, N. Dak.

[21] Appl. No.: 883,275

[22] Filed: Mar. 3, 1978

[51] Int. Cl.³ .................... A01B 63/22; A01B 37/00; A01B 73/00

[52] U.S. Cl. .................... 172/240; 172/134; 172/625; 172/679; 280/415 R

[58] Field of Search ............... 172/134, 240, 245, 248, 172/250, 625, 626, 676, 679; 280/411 R, 411 A, 412, 413, 415 R, 415 A, 478 R, 478 A, 478 B, 462, 463

[56] References Cited

U.S. PATENT DOCUMENTS

| | | | |
|---|---|---|---|
| 1,422,967 | 7/1922 | Griswold et al. | 172/134 |
| 2,658,770 | 11/1953 | Koenig | 280/412 |
| 2,675,752 | 4/1954 | Wangsgard | 172/463 |
| 2,976,058 | 3/1961 | Sandgren | 280/413 |
| 2,979,136 | 4/1961 | Oehler et al. | 172/126 |
| 3,112,124 | 11/1963 | Bartel | 280/412 |
| 3,279,819 | 10/1966 | Edmonds | 280/478 B |
| 3,372,657 | 3/1968 | Hansen | 111/1 |
| 3,511,318 | 5/1970 | Boetto et al. | 172/240 |
| 3,675,725 | 7/1972 | Schultz | 172/245 |
| 3,751,071 | 8/1973 | Patterson et al. | 280/478 A |
| 4,106,788 | 8/1978 | Bohnert | 172/625 X |
| 4,119,329 | 10/1978 | Smith | 280/415 R |
| 4,127,283 | 11/1978 | Baden | 280/411 R |

FOREIGN PATENT DOCUMENTS

| | | | |
|---|---|---|---|
| 758369 | 5/1967 | Canada | 172/240 |
| 482138 | 11/1975 | U.S.S.R. | 172/625 |

*Primary Examiner*—Richard T. Stouffer
*Attorney, Agent, or Firm*—Merchant, Gould, Smith, Edell, Welter & Schmidt

[57] ABSTRACT

A vehicle to be moved in either of two mutually perpendicular directions, and including a first plurality of caster wheels, a second plurality of wheels rotatable on parallel axes to follow a common track aligned with one of the directions, apparatus for moving said second plurality of wheels into and out of contact with the ground, and coupling members for applying tractive force to the vehicle in either of said directions.

3 Claims, 16 Drawing Figures

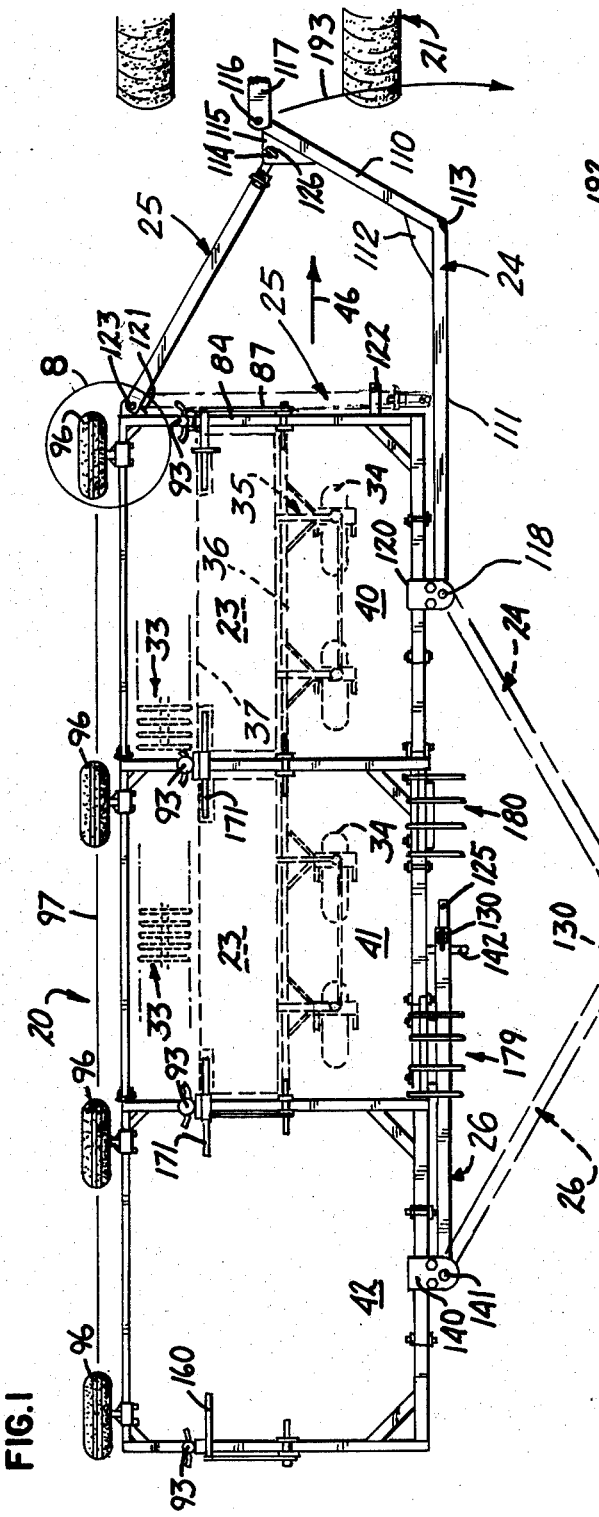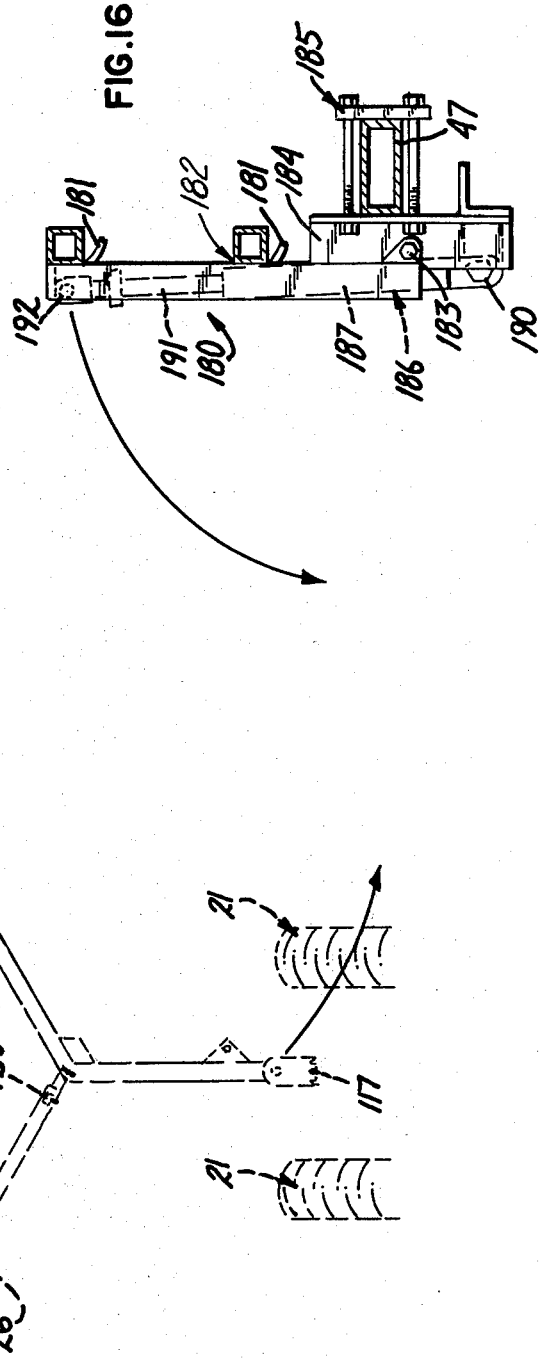
FIG.1
FIG.16

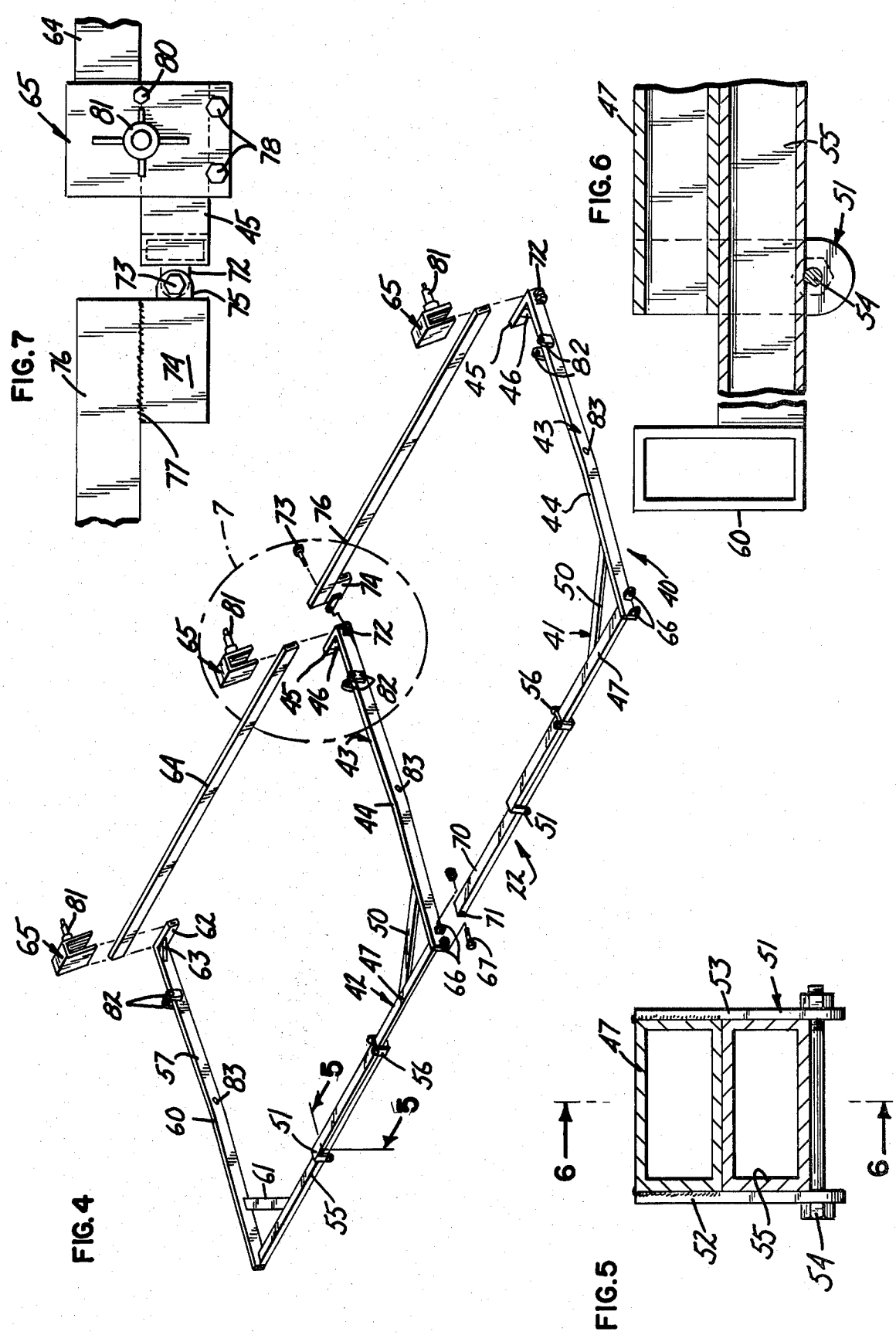

VEHICLE FOR AGRICULTURAL USE WITH TRANSPORT WHEELS

BACKGROUND OF THE INVENTION

This invention relates to the field of agriculture, and particularly to a vehicle designed to be moved over the surface of the ground by a traction vehicle in first and second mutually perpendicular directions. The first direction is one with respect to which the vehicle is long and narrow, so that it can be transported on public highways, in what may be called the transport or road configuration of the vehicle. The second direction is one with respect to which the vehicle is short and wide, so that implements included in the vehicle treat a maximum swath of ground as the vehicle moves, and may be called the field or seeding configuration of the vehicle.

In agricultural communities a recurring situation is that of a farmer who has land to be worked which is not in one continuous area, but is divided into portions separated from one another, and accessible only by use of the public roads. Efficient working of the land requires implements of maximum widths, drawn by traction vehicles of great power, so that a minimum number of passes across the land is necessary. Ganged implements are now available which are wider than the entire width of many public roads, and which would seriously interfere with traffic on even the widest roads.

The limitations on vehicle size, particularly width, when transfer over public highways is contemplated, are well known, and various ways of decreasing the effective width of a farm vehicle have been devised. It is also known to load such a vehicle transversely onto an elongated trailer for transport thereon in end-first fashion.

SUMMARY OF THE INVENTION

The present invention contemplates the construction of a vehicle including a plurality of individual implements such as grain drills, in such a fashion as to obviate the need for any folding mechanism on the one hand, or any independent transport trailer on the other hand. It provides a self-contained structure which may be readily interconnected between a field and a transport configuration by a single workman driving a traction vehicle, the conversion in either direction being quick and simple, and requiring no learning of skills not already familiar to the drivers. It reduces the number of workmen needed and the time required when a ganged implement finishing work at one site must be transferred to a different site, and even eliminates the unhitching and rehitching of the traction vehicle which is sometimes indispensible.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 1 is a plan view of a vehicle according to the invention, shown in the transport configuration in solid lines, and in the field configuration in center lines, parts being omitted for clarity of illustration, and conventional parts being shown in dotted lines;

FIG. 4 is an exploded view of a frame making up a part of the vehicle;

FIG. 5 is a sectional view taken along the line 5—5 of FIG. 4;

FIG. 6 is a sectional view taken along the line 6—6 of FIG. 5;

FIG. 7 is an elevational view of the portion of the invention identified by the oval 7 in FIG. 4, when assembled and viewed from the upper right of that figure;

FIG. 16 is a fragmentary view partly in section of a track buster unit shown in plan to a small scale in FIG. 1.

DESCRIPTION OF THE PREFERRED EMBODIMENT

Figure 2:
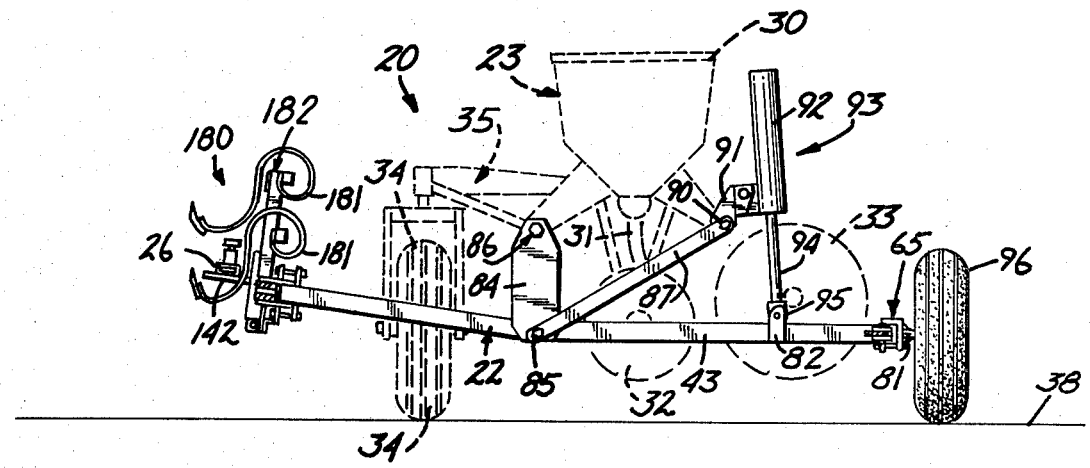
FIG. 2 is a front elevation of the vehicle of FIG. 1 in the transport configuration, parts being omitted or broken away for the purpose of clarity.

In the drawing a working vehicle 20 according to the invention is shown as towed by a traction vehicle 21, illustrated only schematically, and as comprising a frame 22 carried by a plurality of farm implements 23 such as grain drills. Interconnection of the working vehicle with the traction vehicle is accomplished by means including a draft member 24 and a plurality of auxiliary members 25, 26, as will be explained more fully below.

Figure 3:
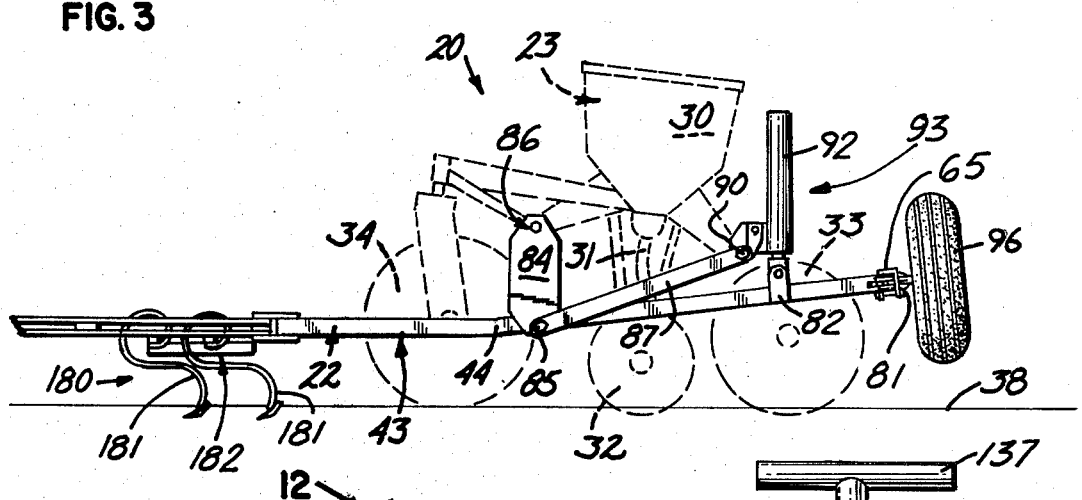
FIG. 3 is a similar view showing the field configuration of the vehicle.

Numerous implements suitable for use in such a vehicle are known, and the details of their structure are significant only as they may require minor changes in the arrangements for mounting frame 22 thereon. In each implement seed is to be supplied from an elongated hopper 30 through a plurality of dropper tubes 31 to the furrows opened by a like plurality of pairs of mutually angulated seed discs 32, and is then covered by a like plurality of cover wheels 33. A pair of caster wheels 34 are carried on suitable brackets 35 at the front of the implement. The implement is assembled on a pair of front and rear cross members 36 and 37 of steel tubing. In use, as shown in FIG. 3, caster wheels 34 ride on the surface 38 of the ground, and discs 32 and wheels 33 act respectively to open the ground and to press the soil firmly about the planted seed.

Frame 22 is made of rectangular steel tubing in a plurality of sections 40, 41 and 42, each supported by one of implements 23: in FIG. 1 the left-most implement is omitted to show the mounting means more clearly.

Section 42 is shown in FIG. 4 to comprise a cross member 43 formed with a slight upward bend at 44. A horizontal stub 45 projects perpendicularly to member 43 at one end thereof and is strengthened by a gusset 46. At the other end of member 43 a further member 47 projects from the upper portion thereof parallel to stub 45: it is reinforced by a diagonal brace 50 and is formed at its remote end with a clamping arrangement 51, composed of a pair of side plates 52 and 53 and a cross bolt 54, by which it telescopically is secured to a still further member 55 having a similar clamping arrangement 56.

Member 55 is secured perpendicularly to a further cross member 57 having a slight bend at 60 and reinforced by a diagonal brace 61. A horizontal stub 62 extends perpendicularly from member 57 in the same direction as member 55, and is strengthened by a gusset 63. Section 42 is completed by a closure member 64 secured to stubs 62 and 45 by U-shaped members 65 better shown in FIG. 7 to which reference will presently be made.

Returning to cross member 43, first bracket means 66 projects from the lower portion of one end thereof, in the direction opposite to member 47, and may comprise a pair of lugs horizontally bored to pass a first pivot bolt 67 and spaced to pass a further member 70 bored at 71 to pass bolt 67 but otherwise like member 55, and provided with a similar clamping arrangement 56. Second bracket means 72 projects horizontally from the other end of member 43, in the opposite direction to stub 45, and may also comprise a pair of lugs horizontally bored to pass a second pivot bolt 73 coaxial with bolt 67. A spacer block 74 is provided with further bracket means 75 in the form of a pair of lugs horizontally bored to pass pivot bolt 73. A further member 76 otherwise like member 64 is secured to block 74 as by welding 77, the positioning of brackets 72 and 75 being such that members 76 and 64 are in alignment.

Members 70 and 76 cooperate with another member 43, by clamp arrangement 51 and U-shaped member 65, exactly as described in connection with section 42. As shown in FIG. 7, each member 65 includes a pair of clamping bolts 78 and a locking bolt 80, and carries on its outer surface a horizontal wheel spindle 81. Section 40 is comprised of members 43–51 and 65–81 as just described for section 41, and it will be evident that as many further sections may be added as the working width of the vehicle requires.

Member 60 and each of members 43 is provided with means for mounting frame 22 on implements 23, comprising a mounting bracket 82 and a mounting hole 83. As shown in FIGS. 2 and 3, a plurality of plates 84 are secured to members 43 by bolts 85 passing through holes 83, and are secured to the ends of members 36 by suitable means indicated at 86 and described more fully in connection with FIG. 13. A plurality of further members 87 are secured at first ends to members 43 by bolts 85, and at second ends to implement cross members 37 by means 90 generally like means 86.

Also secured to implement members 37 by means 90 are a plurality of brackets 91, each of which supports the cylinder 92 of a linear hydraulic motor 93, whose piston 94 extends generally downward and is connected to bracket 82 by a suitable connection 95. It has been found that the hydraulic motors at the ends of the vehicle can be of smaller power rating than those between the implements. Each of spindles 81 mounts a transport wheel 96 (see FIG. 8) which in the transport configuration of the vehicle follow a common track as suggested at 97 in FIG. 1.

FIG. 2 shows the piston of motor 93 extended: implement 23 thus pivots in a counterclockwise direction about bolts 85 to raise discs 32 and wheels 33 out of contact with the ground. The arrangement permits sufficient lift to provide ground clearance even over railroad crossings of highways, which are frequently at the top of slight rises in the highway.

FIG. 3 shows that when the piston of motor 93 is retracted, implement 23 is lowered, so that discs 32 and wheels 33 are in working relation to the ground, and thereafter transport wheels 96 are moved out of engagement with the ground, to permit free movement of the vehicle to the left as seen in the figure.

Figure 8:
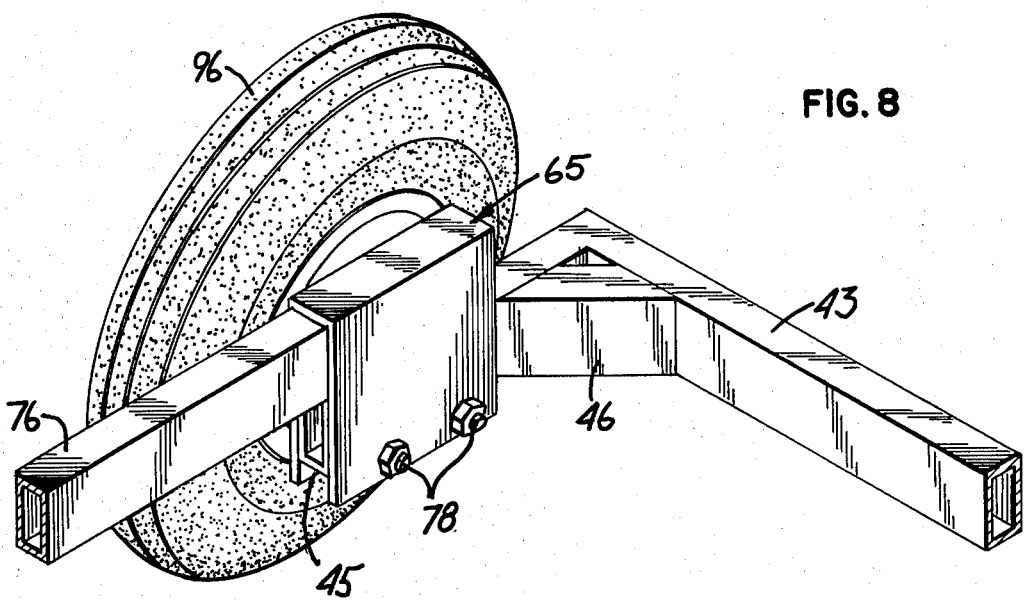
FIG. 8 is a perspective view of the portion of this invention identified by the circle 8 in FIG. 1.
Figure 10:
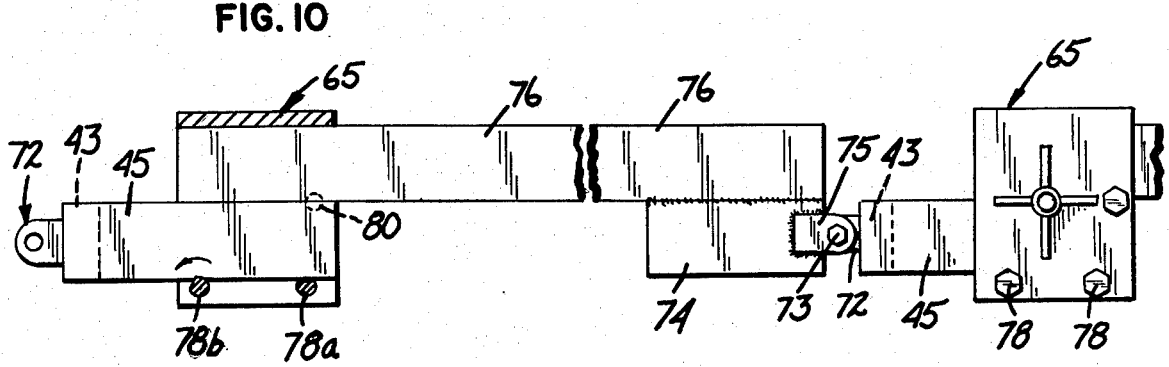
FIG. 10 is a showing of a portion of frame 22 where the bolts of FIG. 9 are applied.
Figure 9:
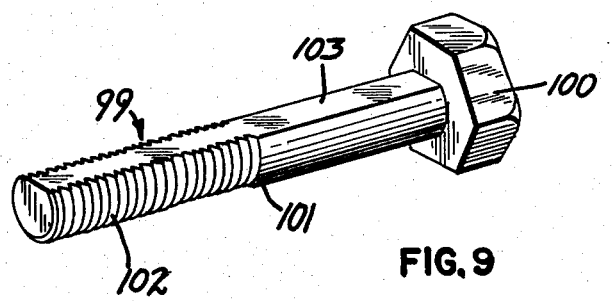
FIG. 9 is a perspective view of a special bolt used in the practice of the invention.

Attention is now directed to FIGS. 9 and 10 for another valuable feature of the invention. FIG. 9 shows a bolt 99 having a head 100 and a stem 101 partially threaded at 102. It is to be noted that stem 101 has a flat 103 extending its full length. These bolts, shown at 54 in FIGS. 5 and 6 and at 78 in FIGS. 7 and 8, are of hardened steel. The holes in members 51, 52 or member 53 are of the same diameter as stem 101, but are so positioned that the bolts will only enter them with the flats up, as shown at 78a in FIG. 10. Then, when the head of the bolt is turned by a suitable wrench, in the same direction as the tightening nut will be turned, the flat of the bolt cuts into the metal adjacent to it, stub 45 in FIG. 10, as suggested at 78b. Member 65 is locked immovably to stub 45, and is cammed tightly against the top of member 76, security being added by locking screw 80 which is positioned to bear on both members 45 and 76.

Turning again to FIG. 1, the means for applying tractive force to the vehicle will now be explained. Draft member 24 comprises first and second components 110 and 111 intersecting at an obtuse angle reinforced by a gusset 112. Bores for a coupling or linch pin are provided at 113, near the angle of the member, and at 114, in a bracket 115 secured to the member near one end, that end also being bored to receive a pin 116 coupling it to the draw bar 117 of traction vehicle 21. The other end of component 111 is pivoted at a pin 118 to a bracket 120 secured to members 47 and 70 of frame section 40. The axes of holes 113 and 114 and of pins 116 and 118 are all vertical.

Figure 11:
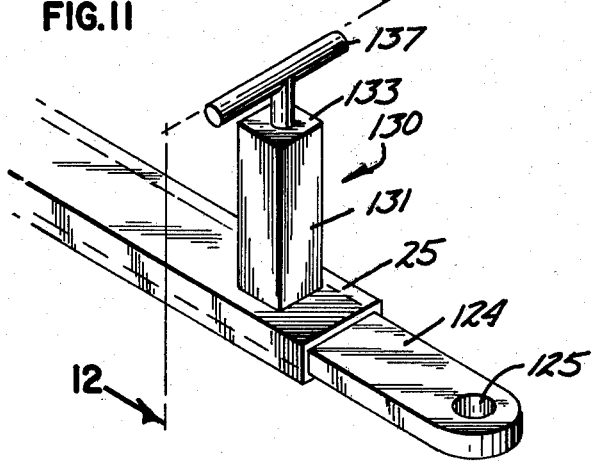
FIG. 11 is a perspective view of one end of auxiliary member 25 to a larger scale.
Figure 12:
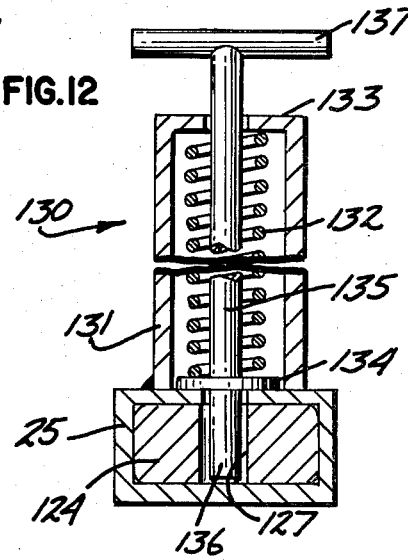
FIG. 12 is a sectional view taken along the line 12—12 of FIG. 11.

Cross member 43 of section 40 is not provided with bracket means 66 and 72 as are the other such members. Instead it is provided near one end with a forwardly extending lug 121, and at the other end with a simple hanger bracket 122, for supporting auxiliary member 25 when not in use. One end of member 25 is pivotally connected to lug 121 by a vertical pin 123. The other end is configured as shown in FIGS. 11 and 12. Member 25 is of tubular steel, and an extension bar 124, of substantially the same length, slides therein. Near its outer end bar 124 is provided with a vertical bore 125 for passage of a linch pin 126 passing through bore 114 in bracket 115. A second vertical bore 127 is provided in bar 124 inwardly of bore 125, for cooperation with an automatic arrest mechanism 130 comprising a housing 131 mounted on top of member 125 and containing a compression spring 132 which acts between the top 133 of housing 131 and a disc 134 carried on a pin 135 extending at one end 136 through the wall of member 25 and through bore 127 in bar 124, and at the other end through housing top 133 to terminate in a T-handle 137.

Referring again to FIG. 1, a bracket 140 like bracket 120 is secured to members 47 and 55 of frame section 42 to pivotally receive at a vertical pivot pin 141 one end of auxiliary member 26, and a hanger bracket 142 is provided for the other end of the member when it is not in use. Member 26 is constructed like member 25 except for its somewhat greater length, and is provided with a similar automatic arrest mechanism 130 and linch pin hole 125.

Figure 13:
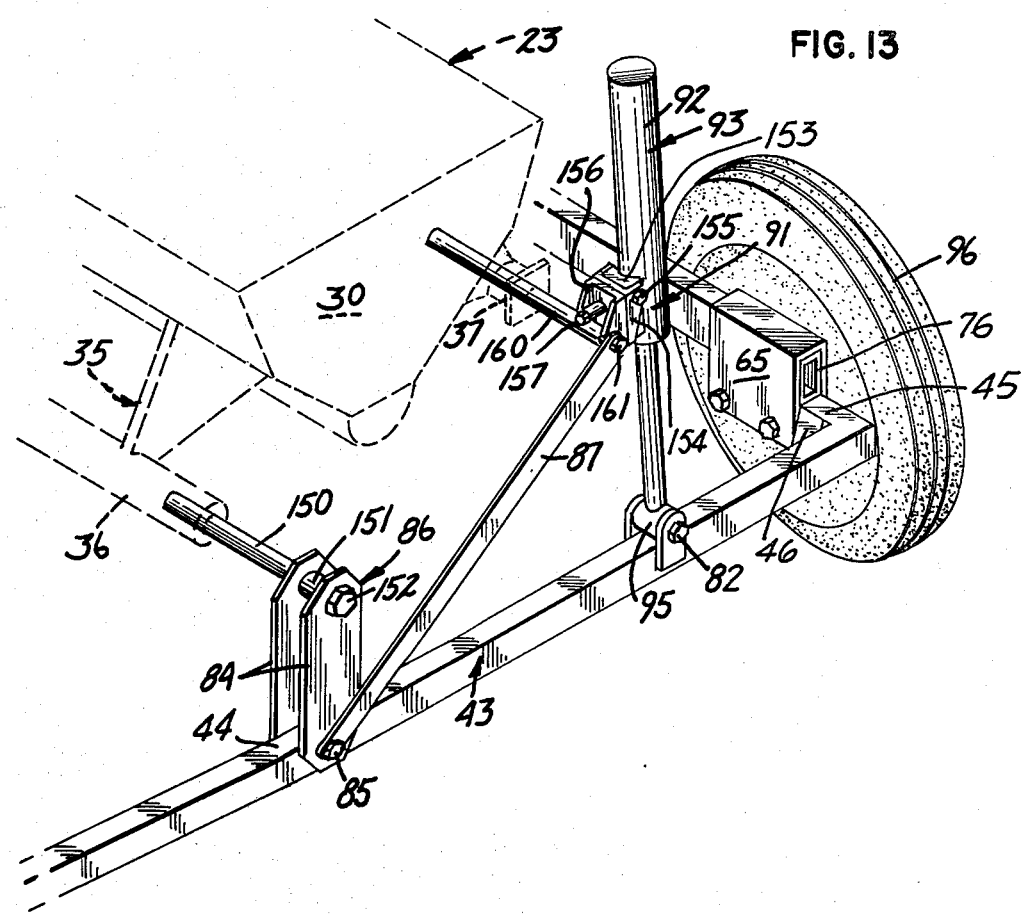
FIG. 13 is a fragmentary view in perspective of one end of the vehicle.

FIG. 13 is presented to show more clearly one manner of implementing the structure shown schematically in FIGS. 2 and 3. Connection means 86 is shown to comprise a bar 150 slidingly received in implement cross member 36. Bar 150 is mounted in plates 84 by means including a spacer 151 and a threaded connector 152. Bracket 91 includes a first portion 153 secured to cylinder 92, a second portion 154 horizontally pivoted to portion 153 by a pivot bolt 155, and a third portion 156 horizontally pivoted to portion 154 by a pivot bolt 157. A bar 160 extends into implement cross member 37, and is secured to portion 156 by a threaded connector 161 to comprise connection means 90 of FIGS. 2 and 3.

Figure 14:
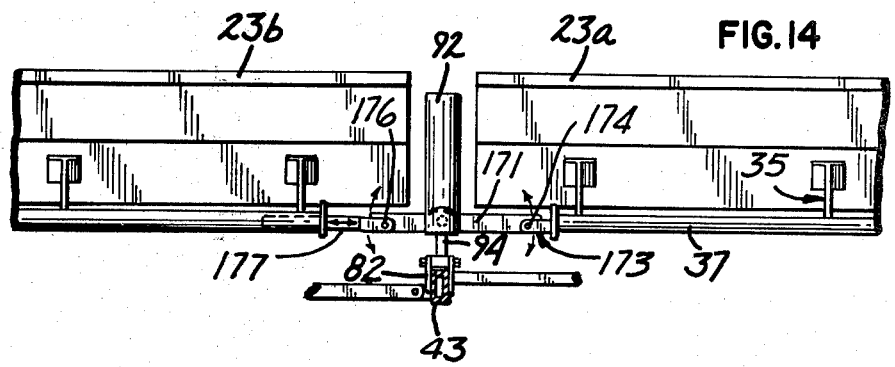
FIGS. 14 and 15 are fragmentary elevation and plan views of mechanism making up the invention and located between adjacent implements.
Figure 15:
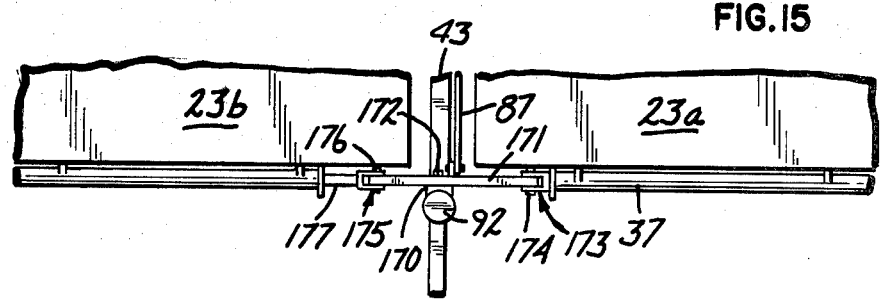

The showing of FIG. 13 applies to the structures at the two ends of the vehicle. The same general structure is used between implements, as is shown in FIGS. 14 and 15. A member 170 generally like portion 153 of FIG. 13 is secured to cylinder 92 of the hydraulic motor, the piston 94 of which is secured to member 43 by bracket 82. A cross-arm 171 is horizontally pivoted to member 170 by a pivot bolt 172 near its center. One end of cross-arm 171 is secured to cross member 37 of implement 23a by a connection 173 including a horizontal pivot pin 174. The other end of arm 171 is secured by a connection 175 having a horizontal pivot pin 176 to a rod 177 slidable in cross member 37 of implement 23b. A similar structure may be provided for cross members 36.

Another feature of the invention is shown in FIGS. 1-3 and 16. A problem encountered in using implements drawn behind traction vehicles such as tractors is that the heavy weight of a powerful tractor compresses the soil contacted by its wheels to a point that soil working machinery does not operate properly, and the crop is reduced by narrow but long areas where growth did not occur. It is known to use "track busters" as attachments following a tractor and preceding the soil working machinery. In the present invention these track busters can be incorporated directly into the working vehicle itself, as will now be explained.

FIG. 1 shows track buster units 179 and 180 carried on frame section 41. Unit 180 comprises a plurality of tines 181 carried in a framework 182: as shown in FIG. 16 framework 182 is pivoted at a point 183 in a mounting rack 184 clamped to member 47 by suitable means 185. A linear hydraulic motor 186 has its cylinder 187 pivoted to rack 184 at a point 190 spaced from point 183, and its piston 191 pivoted to framework 182 at a pivot pin 192. When the piston is extended, framework 182 takes the position with respect to frame 22 which is shown in FIGS. 2 and 16. When the piston is retracted, framework 182 pivots into the position shown in FIG. 3. In that figure it will be seen that when the transport wheels 96 are raised out of contact with the ground, the front end of frame 22, and with it track buster units 179 and 180, approaches the ground more nearly, so that by actuation of hydraulic motor 186 the tines 181 can be brought into working position.

OPERATION

For completeness the method of assembling vehicle 20 will now be briefly outlined. A frame section 41 is assembled about implement 23 by suitably positioning members 43 at each end of the implement's cross members 37 and 40, positioning member 76 and setting pins 73, and tightening the bolts of clamping arrangements 51 and 56 and U-shaped member 65. Two other implements 23 are now properly aligned and positioned on the members 43 already installed, and frame sections 40 and 42 are completed as described above. Wheels 96 are installed, as are track buster units 179, 180. Auxiliary member 25 is pivoted to lug 121 and placed on bracket 122. Bracket 140 is installed at frame section 42, auxiliary member 26 is pivoted thereto and placed on bracket 142, bracket 120 is installed at frame section 40, and draft member 24 is positioned thereon. Hydraulic connections are made to all of motors 93 for simultaneous control, and hydraulic connections are also made to motors 186. The vehicle is now completely assembled.

When it is desired to use the vehicle, a traction vehicle 21 is brought into a position where its draw bar 117 can be coupled by pin 116 to the bore at the end of draft member 24: this can be accomplished anywhere along the arc 193 centered at pin 118. Wheels 96 are lowered by hydraulically energizing motors 93. Member 25 is now lifted from bracket 122 and pointed toward the traction vehicle. Pin 135 is drawn out of bore 127, bar 124 is extended until bore 125 is aligned with bore 114, and linch pin 126 is installed. Now when vehicle 21 is backed somewhat, bar 124 slides in member 25 until bore 127 comes into alignment with pin 135, which drops into place. The two vehicles are now coupled together in the transport configuration, in which work vehicle 20 follows traction vehicle 21, caster wheels 34 taking the position shown in FIG. 1.

When the vehicle has been driven on to a field to be worked, the driver raises wheels 96 by hydraulic motors 93. He disconnects member 25 and replaces it in bracket 122. Then he simply drives vehicle 21 forward slowly. By reason of the location of bracket 120 and the resulting direction of the force acting on vehicle 20, the latter no longer follows vehicle 21 directly, but turns to the left as it follows, reaching a position, generally crosswise to its former position, in which auxiliary member 26 may be extended to engage draft member 24 at bore 113, and the coupling is completed as before, using automatic arrest mechanism 130. Units 179 and 180 may now be lowered by hydraulic motors 186, and field work may be commenced.

After working of the field is completed the reconversion from field configuration to the transport configuration of vehicle 20 is equally simple. Units 179 and 180 are raised. The driver disconnects member 26 and replaces it in bracket 142. Then he simply drives vehicle 21 forward slowly. Vehicle 20 now turns to the right, as it follows vehicle 21, reaching a position in which auxiliary member 25 may be extended to engage draft member 24 at hole 126, and the coupling is again completed using automatic arrest mechanism 130. Wheels 96 may now be lowered and the transport configuration of vehicle 21 is complete. The traction vehicle is never unhitched from member 24.

It is to be particularly noted that when pistons 94 are extended to lower the "rear" long side of frame 22 where wheels 96 are mounted, the "front" long side of the frame is raised, to increase its clearance with respect to the ground during transport and incidently enable the mounting of units 179 and 180 thereon without interference.

From the foregoing it will be evident that I have invented a new and useful vehicle for agricultural use which is easily converted from a transport configuration, suitable for use on the public highways, to a field configuration for maximum efficiency in working the land.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In a wheeled vehicle to be moved over the surface of the ground in first and second mutually perpendicular directions, in combination:
    an agricultural implement having earth-working wheels, rotatable about a common axis, and caster wheels laterally spaced from said common axis;
    a frame having first and second sides extending in said first direction and first and second ends extending in said second direction;
    means mounting said frame on said implement for rotation about a pivotal axis extending in said first direction and located between said caster wheels and said common axis, with said first side of said frame extending laterally beyond said caster wheels and said second side of said frame extending laterally beyond said earth-working wheels;
    a plurality of transport wheels spaced along said second side for tracking in said first direction; and
    reversible means for causing pivotal movement of said frame with respect to said implement, raising or lowering said second side of said frame to transfer a portion of the weight of said implement between said earth-working wheels and said transport wheels.

2. A vehicle according to claim 1, wherein said first and second sides of said frame define a common generally horizontal plane, and said pivotal axis lies outside of the below said plane.

3. In a wheeled vehicle to be moved over the surface of the ground in first and second mutually perpendicular directions, in combination:
    a horizontal, generally rectangular frame having first and second sides extending in said first direction and first and second ends extending in said second direction;
    a rigid draft member comprising first and second portions intersecting to jointly define an obtuse angle in a common plane, said first and second portions each including an end joined to the corresponding end of the other portion and a free end, said draft member being capable of applying force in tension and in compression along a line of action extending between the free ends of said portions;
    coupling means connecting said free end of said first portion to said frame, at a site along said first side between the center thereof and a first, forward end of said frame, for pivotal movement of said draft member about a first, generally vertical axis between a first position and a second position;
    a first auxiliary member for removably connecting a first site on said draft member remote from said coupling means to said first end of said frame at a site remote from said first side; and
    a second auxiliary member for removably connecting a second site on said draft member less remote from said coupling means to said first side of said frame at a site thereon between the center thereof and said second end;
    at least one agricultural implement having earth-working wheels, rotatable about a common axis, and caster wheels laterally spaced from said common axis;
    means mounting said frame on said implement for rotation about a pivotal axis extending in said first direction and located between said caster wheels and said common axis with said second side of said frame extending laterally beyond said earth-working wheels;
    a plurality of transport wheels spaced along said second side for tracking in said first direction; and
    reversible means for causing pivotal movement of said frame with respect to said implement, raising or lowering said second side of said frame, and simultaneously lowering or raising said first side of said frame respectively, to transfer a portion of the weight of said implement between said earth-working wheels and said transport wheels.

* * * * *